(12) United States Patent
Haller (10) Patent No.: US 8,757,600 B2
(45) Date of Patent: Jun. 24, 2014

(54) PNEUMATIC SPRINGING SYSTEM FOR VEHICLES AND METHOD FOR PNEUMATIC SPRINGING OF VEHICLE PARTS

(75) Inventor: Erwin Haller, Birgland (DE)

(73) Assignee: Grammer AG (DE)

( * ) Notice: Subject to any disclaimer, the term of this patent is extended or adjusted under 35 U.S.C. 154(b) by 147 days.

(21) Appl. No.: 13/155,221

(22) Filed: Jun. 7, 2011

(65) Prior Publication Data

US 2011/0298266 A1   Dec. 8, 2011

(30) Foreign Application Priority Data

Jun. 8, 2010   (DE) .......................... 10 2010 022 959

(51) Int. Cl.
*A47C 7/14*   (2006.01)
(52) U.S. Cl.
USPC .......... 267/131; 248/588; 248/566; 267/64.11
(58) Field of Classification Search
USPC .......... 248/564, 566, 588, 618, 631, 595, 592, 248/593; 251/250
See application file for complete search history.

(56) References Cited

U.S. PATENT DOCUMENTS

| | | | |
|---|---|---|---|
| 4,213,594 A | | 7/1980 | Pietsch et al. |
| 4,733,847 A | * | 3/1988 | Grassl ............................ 248/550 |
| 4,946,145 A | * | 8/1990 | Kurabe .......................... 267/131 |
| 5,058,852 A | * | 10/1991 | Meier et al. .................... 248/588 |
| 5,533,703 A | * | 7/1996 | Grassl et al. ................... 248/550 |

(Continued)

FOREIGN PATENT DOCUMENTS

| | | |
|---|---|---|
| DE | 27 53 105 | 11/1977 |
| DE | 2849700 | 5/1980 |

(Continued)

OTHER PUBLICATIONS

Office Action prepared by German Patent Office on Mar. 3, 2011, for German Application No. 2010 022959.8-14.

(Continued)

*Primary Examiner* — Thomas Irvin
(74) *Attorney, Agent, or Firm* — Sheridan Ross P.C.

(57) ABSTRACT

The invention concerns a pneumatic springing system for vehicles with at least a first and a second part (3, 4), wherein the two parts (3, 4) are mounted vibration-mobile and pneumatically sprung in relation to each other by means of at least one pneumatic spring (8), wherein a first control device (10) is arranged to supply air to and extract air from the pneumatic spring (8), which carries out the extraction of air after a first travel end zone (62) of the springing system has been reached in which the pneumatic spring (8) is in a compressed state, and which carries out the supply of air after a second travel end zone (63) of the springing system has been reached in which the pneumatic spring (8) is in an extended state, wherein a second control device (20) is provided to supply air to the pneumatic spring (8) and disable the extraction of air from the pneumatic spring (8) during a pre-determinable first time interval (61) after a first travel end stop (58) in the first travel end zone (62) has been reached for the first time, and/or a third control device (30) is provided to extract air from the pneumatic spring (8) and disable the supply of air to the pneumatic spring (8) during a pre-determinable second time interval after a second travel end stop in the second travel end zone (63) has been reached for the first time.

20 Claims, 5 Drawing Sheets

(56) References Cited

U.S. PATENT DOCUMENTS

| | | | |
|---|---|---|---|
| 5,735,509 A * | 4/1998 | Gryp et al. | 267/131 |
| 5,975,508 A * | 11/1999 | Beard | 267/136 |
| 7,040,600 B2 * | 5/2006 | Lutzer | 251/250 |
| 7,401,759 B2 * | 7/2008 | Alfieri | 251/14 |
| 7,770,974 B2 * | 8/2010 | Ott et al. | 297/344.15 |
| 8,182,038 B2 * | 5/2012 | Haller | 297/344.16 |
| 2006/0255623 A1 * | 11/2006 | Haller | 296/190.07 |
| 2006/0278805 A1 * | 12/2006 | Haller | 248/588 |
| 2008/0197684 A1 * | 8/2008 | Ott et al. | 297/344.16 |
| 2009/0272871 A1 * | 11/2009 | Haller | 248/631 |
| 2010/0181708 A1 * | 7/2010 | Kolb et al. | 267/113 |

FOREIGN PATENT DOCUMENTS

| | | |
|---|---|---|
| DE | 10317134 | 6/2004 |
| DE | 102005051228 | 5/2007 |
| DE | 102007056700 | 6/2009 |
| DE | 102008050192 | 3/2010 |
| EP | 1468870 | 10/2004 |
| EP | 1724131 | 11/2006 |

OTHER PUBLICATIONS

Official Action (no English translation available) for German Patent Application No. 102010022959.8 dated Dec. 16, 2013, 3 pages.

Extended European Search Report (no English translation available) for European Patent Application No. 11168453.6 dated Jul. 26, 2013, 3 pages.

* cited by examiner

PNEUMATIC SPRINGING SYSTEM FOR VEHICLES AND METHOD FOR PNEUMATIC SPRINGING OF VEHICLE PARTS

The invention concerns a pneumatic springing system for vehicles with at least a first and a second part, wherein both parts are mounted so as to be movable in an oscillating manner and pneumatically sprung with respect to each other by means of at least one pneumatic spring, according to the preamble of claim 1 and a method of pneumatic springing of vehicle parts according to the preamble of claim 10.

Pneumatic springing systems for vehicles and methods for pneumatic springing of vehicle parts are known from various parts of a vehicle. Pneumatic springing systems are used in particular on pneumatically sprung vehicle seats, pneumatically sprung vehicle cabs and pneumatically sprung vehicle chassis.

In particular with pneumatically sprung vehicle seats, the problem often arises that due to the design and because of the limited installation space available within the vehicle, there is only limited residual spring travel of pneumatic springs which are fitted for spring-mounting between the upper and lower parts of the vehicle seat. This applies in particular if first a slightly lower seating position of the vehicle seat is set when it is used for example by a smaller person who as driver must keep his or her feet in constant contact with the brake and accelerator pedals of the vehicle. In this case when travelling over a very uneven road surface, there is a high risk that on initiation of vibration from below i.e. when driving over a protrusion on the road surface, the pneumatic spring will be so severely compressed or squashed that it reaches its travel end stop, whereby this end stop may be reached not only for a pneumatic spring but also for any other movable in an oscillating manner element within the vehicle seat which can also reach a travel end position, for example due to limited installation space.

Usually in such pneumatically sprung vehicle seats, a relatively stable level position of the vehicle seat is set by regulation using a so-called open control. This means that by means of a control, when a vibration is initiated in the springing system, either compressed air is supplied to the springing system and hence to the pneumatic spring or it is discharged from these. For example air is supplied on severe compression of the pneumatic spring due to strong initiation of a vibration movement when travelling over a road protrusion, whereas when the pneumatic spring extends during a severe initiation of vibration due to driving over a slope in the road, air is discharged from the pneumatic spring.

If now in the springing system and hence the pneumatic spring, on initiation of severe vibration movements, only a limited spring travel is available to compensate for the vibration movement, there is a risk of contacting the travel end stop, which can be very painful for the driver. As a countermeasure frequently additional hydraulic dampers are set such that they have a hard damping and can counter the vibration movement. This has the consequence that although the travel end stops or end positions are not reached, the vibration movements initiated in the spring system and hence in the vehicle seat are lightly damped in a manner perceptible to the driver.

A further known countermeasure is to adjust the height of the vehicle seat so that the springing system is again arranged in a central position in relation to the spring travel available. This can however again have the consequences that if the driver is a small person, he/she can no longer safely operate the vehicle as the brake pedal, clutch pedal and similar can no longer be reliably reached with the feet.

Consequently the present invention is based on the object of providing a pneumatic springing system for vehicles and a method of pneumatic springing of vehicle parts in which, despite a limited available residual spring travel of the springing system and in particular a pneumatic spring used for pneumatic suspension, a person seated in the vehicle experiences a high seating comfort.

This object is achieved according to the device by the features of claim 1 and according to the method by the features of claim 10.

An essential point of the invention is that in a pneumatic springing system for vehicles with at least a first and second part, wherein the two parts are mounted so as to be movable in an oscillating manner and pneumatically sprung with respect to each other by means of at least one pneumatic spring and a first control device is arranged to supply air to and discharge air from the pneumatic spring which discharges the air after a first travel end position of the springing system has been reached in which the pneumatic spring is in its compressed state, and which supplies air after a second travel end position of the springing system has been reached in which the pneumatic spring is in its extended state, a second control device is provided to supply air to the spring and disable the discharge of air from the pneumatic spring during a pre-determinable first time interval after a first travel end stop in a first travel end zone has been reached for the first time. Additionally or alternatively a third control device can be provided to discharge air from a pneumatic spring and disable the supply of air to the pneumatic spring during a pre-determinable second time interval after a second travel end stop in a second travel end zone has been reached for the first time.

By means of such a pneumatic springing system it is possible for the first time to adapt temporarily i.e. for a pre-determinable time interval, preferably for the total duration of severe initiation of vibration movements in the spring system, the residual spring travel available when reaching travel end stops. Such a dynamic spring travel adaptation for a pneumatic springing systems leads to a state of the pneumatic spring, in which, so far previously air was discharged from the spring to avoid a travel end stop of the extending pneumatic spring, the second control device which can be arranged separately or integrated in the first control device together with the third control device supplies air to the pneumatic spring, wherein simultaneously the so far usual discharge of air from the pneumatic spring is disabled. This only happens during a pre-determinable time period i.e. during a pre-determinable first time interval after the first travel end stop has been reached for the first time in order to achieve, limited to this first time interval during which the initiation of severe vibration takes place, a damping of the vibration movement of the springing system in this case on an extending pneumatic spring. This occurs on vehicle seats when the vehicle seat moves up, i.e. the upper part of the vehicle seat moves away from the lower part of the vehicle seat. As soon as this initiation of a severe vibration movement diminishes and the pre-determinable time interval has expired, a return to normal air discharge mode takes place and no more air is supplied to the pneumatic spring during the upward movement of the vehicle seat.

In contrast by means of the third control device, on reaching a top travel end position of the pneumatic spring, air is then discharge instead of air being supplied, as would be the case with normal vibration without the initiation of severe vibration. This takes place until the pre-determinable second time interval has expired. During this second time interval i.e. during the initiation of severe vibration for a downward directed movement of the vehicle seat which stops on reaching the top travel end position and is carried out when, on reaching the top travel end stop, a vibration is initiated due to driving over a severe slope in the road surface, in contrast to the former usual method air is not supplied as would be the case on the initiation of weaker vibration movements, but the third control device discharges the air directly after the end stop has been reached. This discharge of air by means of the third control device during a downward directed movement of the vehicle seat is performed alternately with the supply of air by the second control device during an upward directed movement of the vehicle seat until the first and second time intervals have expired, the duration of which depends on the duration of the initiation of strong vibration movement.

Preferably the disabling of the air discharge during the supply of air by the second control device and the first control device, and the disabling of the air supply by the first control device during the discharge of air by the third control device and by the first control device, are controlled by the vibration frequency of the parts which are mounted as to be mutually movable in an oscillating manner. This means that as soon as for example a vibration frequency of the springing system and hence the parts which are mutually mounted so as to be movable in an oscillating manner exceeds 0.5 Hz, the discharge of air is disabled after reaching the lower travel end top of the vehicle seat. After reaching the upper travel end stop however the air supply is also disabled above a particular vibration frequency of for example 0.5 Hz. Consequently after reaching the travel end stops, the residual spring travel lengths increase until no more travel stops are contacted. This gives the residual spring travel necessary for optimum vibration movement of the springing system with optimum avoidance of reaching the travel end stops.

After reaching the upper travel end stop of the vehicle seat i.e. after an upward movement of the vehicle seat, it is not the air discharge which is disabled as when reaching the lower end travel stop, but the air supply.

Evidently the second or third control device can also be used alone i.e. without the third or second control device. This has the consequence that the residual spring travel optimisation is achieved only after reaching a lower travel end stop or after reaching an upper travel end stop.

The return to the normal vibration control process, in which only the first control device is active and not directly the second and third control devices, can again be made dependent on the vibration frequency of the parts which are mounted so as to be movable in an oscillating manner. Preferably such a reset frequency is set at less than 0.8 Hz.

According to a preferred embodiment the second control device has a first control valve, preferably a 2/2 way valve, which is arranged in an air discharge line connecting the pneumatic spring with the first control device to enable and disable the discharge of air from the pneumatic spring. The third control device can also have a second control value, preferably a 2/2 way valve, which is arranged in a supply air line connecting the pneumatic spring with the first control device to enable and disable the supply of air to the pneumatic spring.

According to a preferred embodiment the second and third control valve are each switchable by means of at least one movable element that can be moved by one of the elements which are mounted so as to be movable in an oscillating manner.

Each movable element is connected with a movement delay member in order, during the first and/or second time interval, to move the movable element back with a delay to a starting position against a spring application force.

According to a refinement of the invention the movable element is formed as a toothed rack and the movement delay member is formed as a rotatable toothed wheel which cooperates with the toothed rack and can be subjected to a pre-determinable torque, wherein the torque of for example 10 Ncm acts only in a first direction of rotation of the toothed wheel in which the toothed rack is moving from a deflection position to the starting position. If however the toothed rack is moved from the starting position to the deflection position, a torque of 0 Ncm is applied so that the first and second time intervals start on movement or shifting of the toothed rack and simultaneous switching or activation of the first and/or second control valve takes place immediately after activation by a part which is mounted so as to be movable in an oscillating manner and which is just in front of the travel end stop of the springing system.

According to a preferred embodiment, from a pre-determinable vibration frequency of the parts which are mounted so as to be movable in an oscillating manner, a vibration frequency switch device disables the discharge of air from the pneumatic spring at the beginning of the first time interval and disables the supply of air to the pneumatic beginning at the start of the second time interval.

The springing system according to the invention and the method according to the invention can be used for example on vehicle seats, wherein the first part is the upper part of a vehicle seat and the second part is the lower part of a vehicle seat. Alternatively it can be used for vehicle cabs, wherein the first part is the vehicle cab itself and the second part for example is the vehicle chassis. Also it can be used on vehicle running gear, wherein the vehicle frame is the first part and the wheel suspension is the second part.

A method is also shown for pneumatic springing of vehicle parts with at least one first and one second part, wherein both parts are mounted so as to be movable in an oscillating manner and mounted pneumatically sprung with respect to each other by means of at least one pneumatic spring, wherein the first control device supplies air to and discharges air from the pneumatic spring, which performs the discharge of air after a first travel end zone of the vehicle system has been reached in which the pneumatic spring is in a compressed state, and which carries out the supply of air after a second travel end zone of the springing system has been reached in which the pneumatic spring is an extended state, wherein by means of a second control device air is supplied to the pneumatic spring and the discharge of air from the pneumatic spring is disabled during a pre-determinable first time interval after a first travel end stop in the first travel end zone has been reached for the first time, and/or by means of a third control device during a pre-determinable second time interval air is discharged from the pneumatic spring and the supply of air to the pneumatic spring disabled after a second travel end stop in the second travel end zone has been reached for the first time.

Further advantageous embodiments arise from the subclaims and the subsequent description in conjunction with the drawing which shows:

Figure 1:
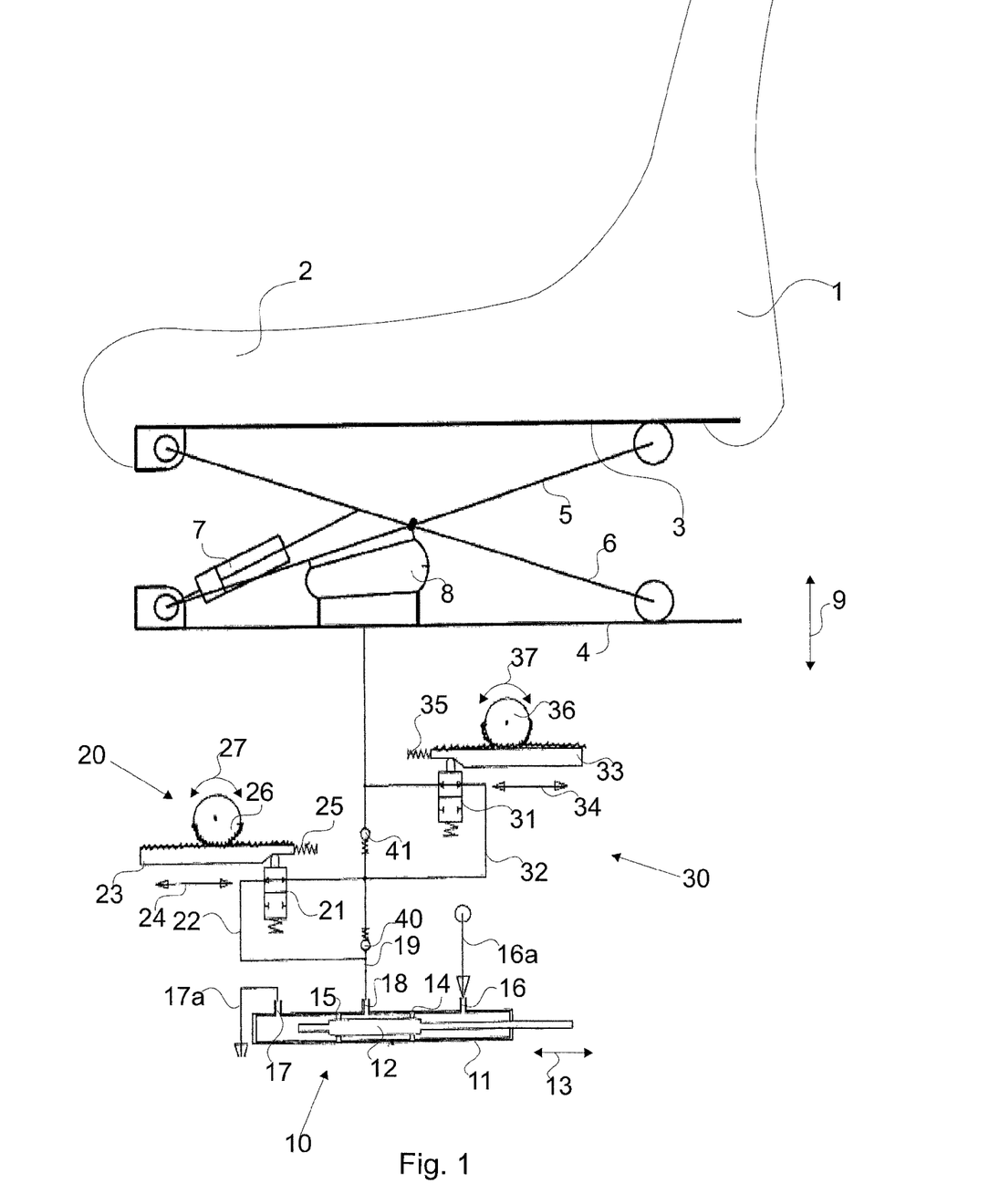
FIG. 1 in a diagrammatic depiction, in principle the function of the pneumatic springing system according to the invention according to an embodiment of the invention during a normal vibration movement without reaching the travel end stop.

FIG. 1 shows in a diagrammatic view the basic principle of the pneumatic springing system using a vehicle seat. The vehicle seat has a back rest 1 and an upholstered seat part 2 which is arranged on the upper vehicle seat part 3. The vehicle seat part 3 is mounted so as to be movable in an oscillating manner and pneumatically sprung with respect to a lower vehicle seat part 4 and can vibrate upward and downward as indicated by the double arrow 9.

By means of a scissor-type frame with scissor arms 5, 6, the upper vehicle seat part 3 is spaced from the lower vehicle seat part 4. A pneumatic spring 8 is arranged between the scissor arm 5 and the lower vehicle seat part 4. An additional damper 7 is attached firstly to the lower vehicle seat part 4 and secondly to the scissor arm 6.

A first control device 10 serves to supply air to and discharge air from the pneumatic spring 8. The first control device 10 comprises a housing 11 with a piston-like element 12 arranged therein which can move in the longitudinal direction as indicated by double arrow 13.

The piston-like element 12 comprises two spaced sealing elements 14 and 15 and is mounted sealed against the housing.

Air 16a is supplied to an inlet opening 16 and air 17a discharged from an outlet 17.

A further inlet and outlet 18 serves for supply and discharge of air by means of the line 19 to and from the pneumatic spring 8.

Depending on the precise position of the piston-like element 12, air can either be supplied or discharged or a closed system can be set without the air supply and discharge. If for example the piston-like element 12 is moved to the right, via the line 19 air can be diverted from the pneumatic spring 8 into the inlet and outlet opening 18 and escape via outlet 17. If however the piston-like element 12 is moved to the left, air 16a can be diverted via the inlet 16 past the sealing element 14, via the inlet and outlet 18 and line 19 to the pneumatic spring 8.

A second control device 12 essentially comprises a 2/2 control valve 21 which is arranged within an air discharge line 22. By moving or shifting a toothed rack 23 as shown by double arrow 24, the control valve 21 is deflected by means of the shoulder in the toothed rack 23 and as a result the air discharge line 22 can be either be interrupted or switched to passage.

Cooperating with the toothed rack 23 is a toothed wheel as a movement delay member, conventionally called a Honig motor, with reference numeral 26. This toothed wheel can be moved to left or right according to double arrow 27 in synchrony and for isochrony with the shifting of the toothed rack 23 in that the teeth of the toothed rack 23, which engage in the teeth of the toothed wheel 26, twist the toothed wheel 26.

A third control device 30 is also constructed similar to the second control device. Again a control valve is present in the form of a 2/2 control valve 31 which is arranged within a supply air line 32 to interrupt this or switch it to passage.

Also a toothed rack 33 is provided which can be moved in a reciprocating manner along the double arrow 34 and, like the toothed rack 23 with the spring 25, can be sprung-loaded by the spring 35 as soon as a shift takes place. The toothed rack 33 in turn cooperates with a toothed wheel 36 which is formed as a time delay member and can be twisted along the double arrow 37.

Both the toothed wheel 26 and the toothed wheel 36 have a torque of for example 10 Ncm when the toothed wheel moves such that the toothed rack 22, 33 is pushed back into its starting position, i.e. towards the centre of the diagram. The torque is countered by springs 25, 35 which are tensioned by deflection of the toothed rack 23, 33.

Figure 2:
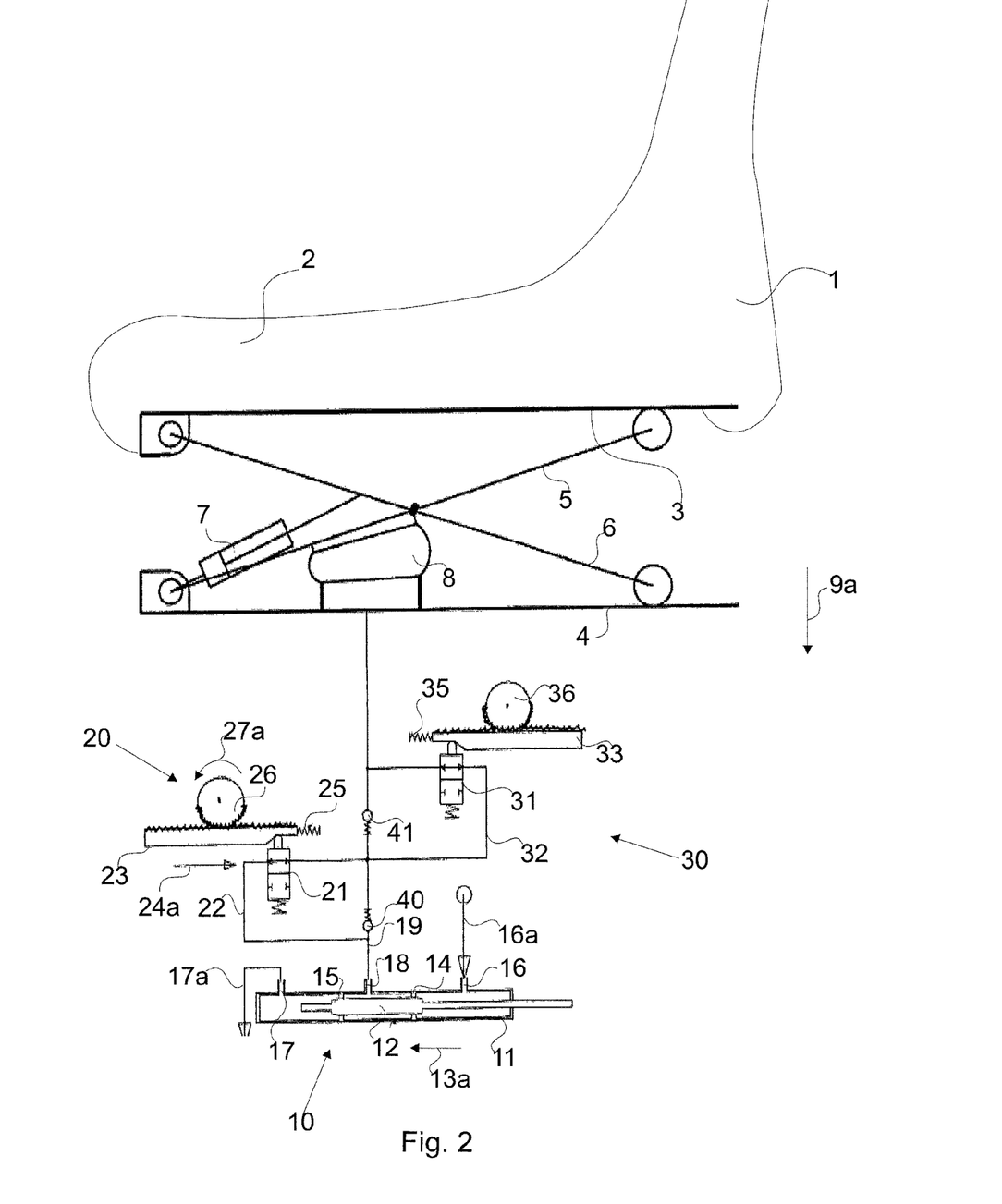
FIG. 2 in a diagrammatic depiction the pneumatic springing system according to the embodiment after reaching a lower travel end stop.

FIG. 2 shows a diagrammatic depiction of the basic principle of the pneumatic springing system according to the invention in an embodiment of the invention wherein this depiction shows a state of the control devices and vehicle seat which is assumed after a lower travel end stop has been reached for the first time.

The same and similar parts have the same reference numerals.

This diagram shows that the vehicle seat is deflected downward as is clearly evident from the compressed or squashed pneumatic spring 8. The pneumatic spring 8 or another part of the vehicle seat has already reached a travel end stop, whereupon shortly after reaching the travel end stop the second control device 20 is activated. This is achieved in that the toothed rack 23, on reaching the travel end stop, has been deflected and moved in the direction of arrow 24a. This deflects the control valve 21 which leads to an interruption in the air discharge line 22. This is clear from the drawing.

At the same time the spring 25 is tensioned because of the shift of the toothed rack 23.

Also the toothed wheel 26 has rotated about its axis in the direction of arrow 27a.

The third control device however is so far unchanged.

In the first control device 10 the piston-like element 12 is now moved to the left so that air 16a can flow out through the inlet 16 from the inlet and outlet 18 and can flow via the line 19 and valve 40 and supply line 32 into the pneumatic spring 8. In this state—as intended—the discharge line is therefore interrupted and the supply line 32 is switched through.

Figure 3:
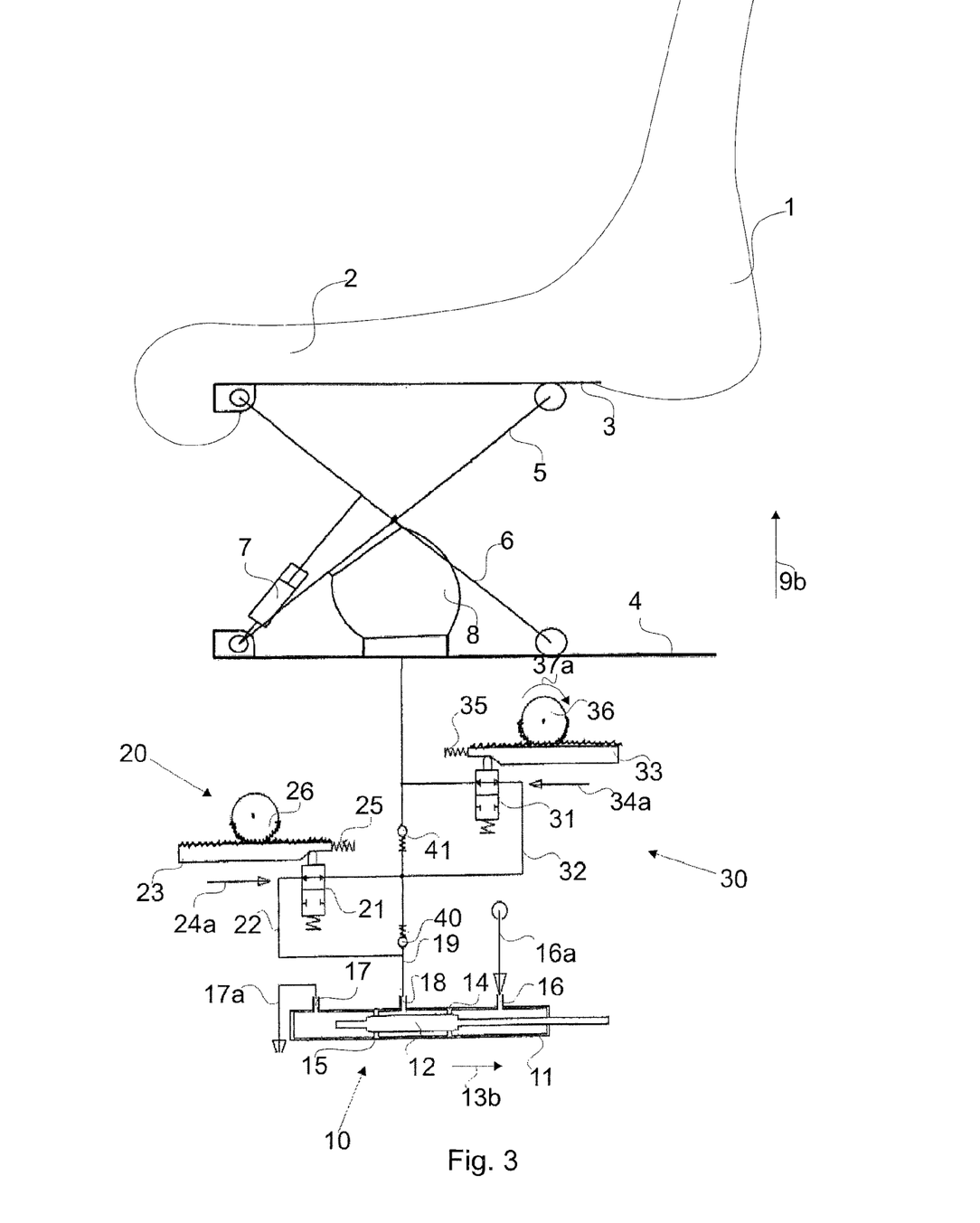
FIG. 3 in a diagrammatic depiction the pneumatic springing system according to the invention according to the embodiment of the invention after reaching the upper travel end stop.

FIG. 3 shows the basic principle of the pneumatic springing system according to the invention with associated vehicle seat in a further state after reaching the upper travel end stop. The same and similar parts have the same reference numerals.

It is clear from this depiction that now the third control device 30 has been activated, while in contrast the second control device 20 is inactive in that the toothed rod 23 is not deflected. The toothed rack 33 however is deflected against the tension force of the spring 35. Thus the control valve 31 is switched and thus the air supply line 32 is interrupted, as is clearly shown from the drawing.

Arrow 34a shows the movement of the toothed rack for the deflection i.e. for the movement into a deflection position, and arrow 37a shows the rotary movement of the cog 36 which accompanies the deflection movement of the toothed rack 33.

At the same time in the first control device 10 the piston-like element 12 is moved to the right as indicated by arrow 13b. As a result air 17a can escape via the outlet 17, the inlet and outlet 18 and the line 19, the discharge line 22 and the non-return valve 41.

After such a deflection of the toothed rack 33 in FIG. 3 or the toothed rod 23 in FIG. 2, a slow backward movement of the toothed rack occurs due to the spring pressure from the spring force 35 or 25, wherein this movement is therefore slow as the Honig motor-like element in the form of the toothed wheel 26, 36 counters this with a torque. On deflection of the toothed rack 23, 33 in the opposite direction however i.e. out of the starting position into the deflection position, no torque is applied through the toothed wheel 26, 36.

The time interval within which the Honig motor can return the toothed rack or rods 23, 33 to their starting position and hence switch the valves 21, 31 into through connection mode, is preferably adjustable between 0 and 10 seconds.

Figure 4:
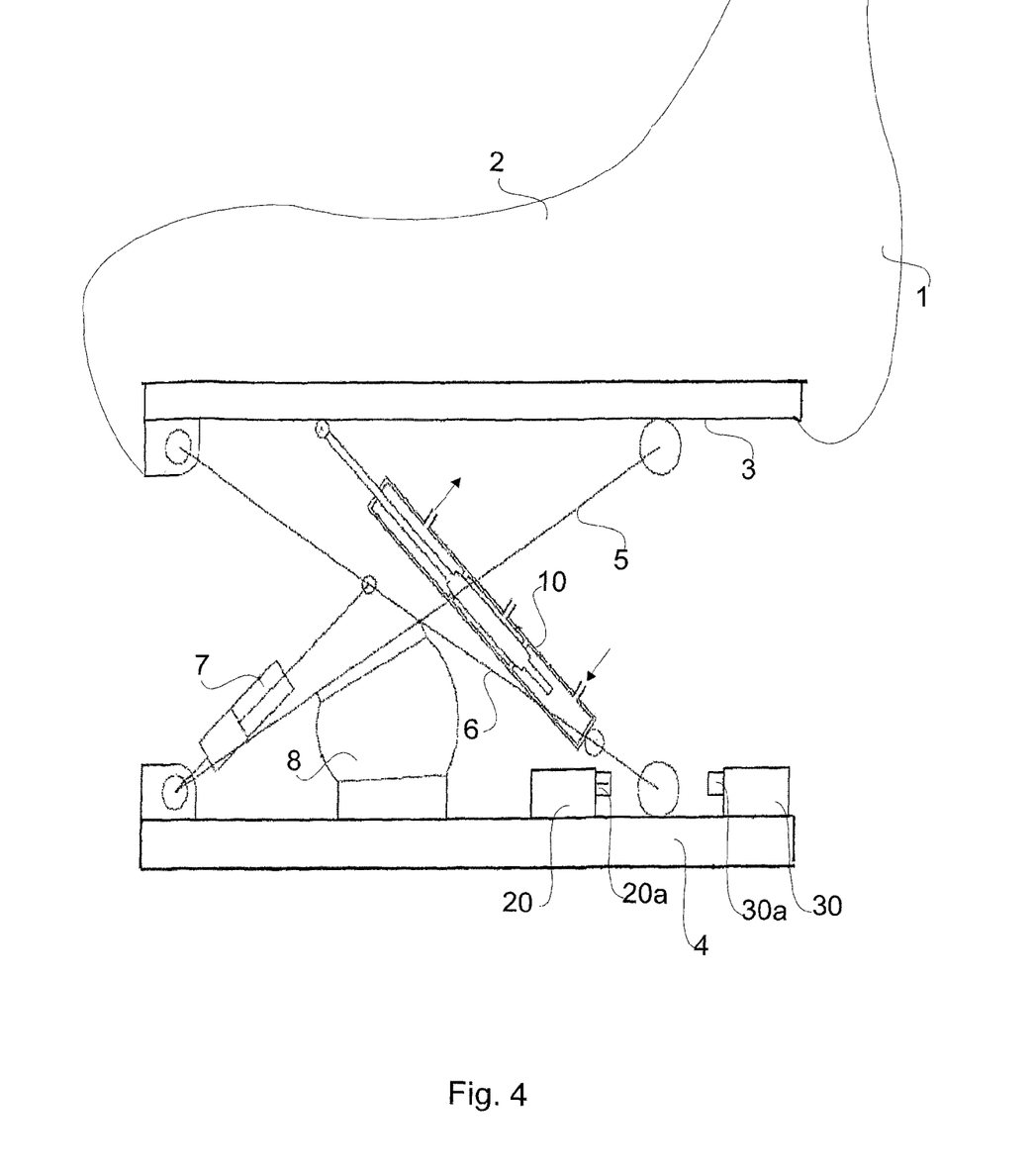
FIG. 4 in a diagrammatic depiction a vehicle seat with the pneumatic springing system according to an embodiment of the invention.

FIG. 4 shows a diagrammatic view of the components of the springing system according to the invention. The same and similar components have the same reference numerals.

It is clear from this drawing that the first control device 10 is preferably positioned between the upper vehicle seat part 3 and the scissor arm 6. It is also clear from this drawing that the second and third control devices 20 and 30 can preferably be arranged in the form of separate components, even subsequently, wherein these components e.g. can interact with a roller-like element 6a connected with the scissor arm 6 in that the roller-like element 6a is rolled to the left or right depending on deflection of the scissor arm and momentary height setting of the vehicle seat.

This roller-like element 6a, at a pre-definable travel end stop in the second control device 20, activates a control element 20a which interacts with the toothed rack 23. On reaching a lower travel end stop the roller-like element 6a interacts with a control element 30a of the third control device which interacts with the toothed rack 33.

Figure 5:
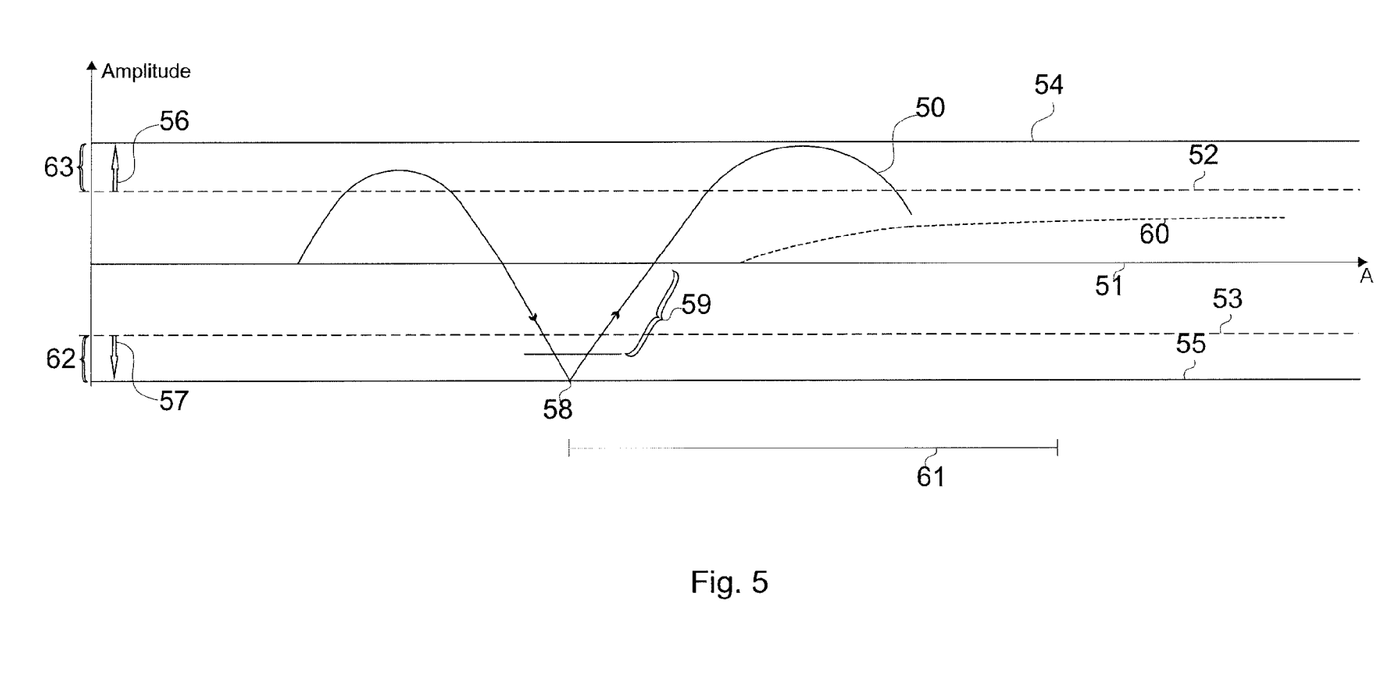
FIG. 5 in a diagram the development of the vibration movement in accordance with the method according to the invention as it can be performed by the pneumatic springing system after reaching a lower travel end stop.

FIG. 5 shows a diagram of the vibration development of the pneumatic springing system according to the invention on reaching a lower travel end stop of the springing system.

It is clear from this drawing that a vibration 50 performed by the pneumatic springing system takes place above or below a normally existing neutral line 51. On an upward directed deflection of the springing system, as soon as a line 52 is reached, normally air is discharged from the pneumatic spring in order to counter the vibration movement in the direction of neutral line 51. Also on crossing a line 53 air is supplied to counter a vibration movement in the direction of the neutral line 51. This applies to a normal vibration i.e. without reaching the travel end stop.

If, however, an upper travel end stop 54 or a lower travel end stop 55 is reached, as shown in this view for reaching the lower travel end stop i.e. again a movement takes place in the direction of arrow 56 or 57, on reaching the lower travel end stop 58 immediately thereafter in the curve section 59 air is not discharged as described above and as is normally the case, but air is supplied. This means that the neutral line 51 is then raised or shifted as shown by line 60.

Such a supply of air instead of discharge of air on an upward directed movement immediately after reaching the lower travel end stop, and naturally a discharge of air instead of a supply of air on the downward directed movement, is carried out during a pre-determinable time interval 61.

This diagram also shows the first and second travel end zones 62 and 63.

All the features disclosed in the application documents are claimed as being essential to the invention, in so far as they are novel either individually or in combination as compared with to the prior art.

Reference Numeral List

1 Back rest
2 Seat part
3 Upper vehicle seat part
4 Lower vehicle seat part
5, 6 Scissor arm
6a Roller-like element
7 Damper
8 Pneumatic spring
10 First control device
11 Housing
12 Piston-like element
13 Double arrow
13b Arrow
14, 15 Sealing elements
16 Inlet opening
16a Air
17 Outlet
17a Air
18 Inlet and outlet
19 Line
20 Second control device
20a Control element
21 2/2 control valve
22 Air discharge line
23 Toothed rack or Toothed rods
24 Double arrow
24a Arrow
25 Spring
26 Honig motor
27 Double arrow
27a Arrow
30 Third control device
30a Control element
31 2/2 control valve
32 Supply air line
33 Toothed rack
34 Double arrow
34a Arrow
35 Spring
36 Toothed wheel
37 Double arrow
37a Arrow
40 Valve
41 Non-return valve
50 Vibration
51 Neutral line
52, 53 Line
54 Upper travel end stop
55, 58 Lower travel end stop
56, 57 Arrow
59 Curve section
60 Line
61 Pre-determinable time interval
62, 63 First and second travel end zones

The invention claimed is:

1. A pneumatic springing system for vehicles, comprising:
at least a first part and a second part;
at least one pneumatic spring, wherein the first and second parts are mounted so as to be movable in an oscillating manner and pneumatically sprung with respect to each other by means of at least one pneumatic spring;
a first control device, wherein the first control device is arranged to supply air to and discharge air from the pneumatic spring, wherein the first control device carries out the discharge of air after a first travel end zone of the springing system has been reached in which the pneumatic spring is in a compressed state, and wherein the first control device carries out the supply of air after a second travel end zone of the springing system has been reached in which the pneumatic spring is in an extended state;
a second control device, wherein the second control device is provided to supply air to the pneumatic spring and to disable a discharge of air from the pneumatic spring during a pre-determinable first time interval after a first travel end stop in the first travel end zone has been reached for the first time; and
a third control device, wherein the third control device is provided to discharge air from the pneumatic spring and to disable the supply of air to the pneumatic spring during a pre-determinable second time interval after a second travel end stop in the second travel end zone has been reached for the first time.

2. The springing system according to claim 1, wherein the springing system includes a second control device, and wherein the second control device comprises a first control valve that is arranged in an air discharge line connecting the pneumatic spring with the first control device to enable and disable the discharge of air from the pneumatic spring.

3. The springing system according to claim 2, wherein the springing system includes a third control device, and wherein the third control device comprises a second control valve that is arranged in a supply air line connecting the pneumatic spring with the first control device to enable and disable the supply of air to the pneumatic spring.

4. The springing system according to claim 3, wherein the second and third control devices can each be switched by means of at least one movable element which can be moved by one of the parts which are mounted so as to be movable in an oscillating manner.

5. The springing system according to claim 4, wherein each movable element is connected with a movement delay member in order, during the first or second time interval, to move the movable element back with a delay into a starting position against the spring application force.

6. The springing system according to claim 5, wherein each movable element is a toothed rack and the movement delay member cooperating therewith is a rotary damper with a predetermineable torque applyable, rotatable toothed wheel.

7. The springing system according to claim 6, wherein the torque acts only in a first rotation direction of the toothed wheel in which the toothed rack moves from a deflection position to the starting position.

8. The springing system according to claim 7, wherein the first control device, from a pre-determinable vibration frequency of the parts which are mounted so as to be movable in an oscillating manner, disables the discharge of air from the pneumatic spring at the start of the first time interval and disables the supply of air to the pneumatic spring at the start of the second time interval.

9. The springing system according to claim 6, wherein the first control device, from a pre-determinable vibration frequency of the parts which are mounted so as to be movable in an oscillating manner, disables the discharge of air from the pneumatic spring at the start of the first time interval and disables the supply of air to the pneumatic spring at the start of the second time interval.

10. The springing system according to claim 5, wherein the first control device, from a pre-determinable vibration frequency of the parts which are mounted so as to be movable in an oscillating manner, disables the discharge of air from the pneumatic spring at the start of the first time interval and disables the supply of air to the pneumatic spring at the start of the second time interval.

11. The springing system according to claim 4, wherein the first control device, from a pre-determinable vibration frequency of the parts which are mounted so as to be movable in an oscillating manner, disables the discharge of air from the pneumatic spring at the start of the first time interval and disables the supply of air to the pneumatic spring at the start of the second time interval.

12. The springing system according to claim 4, wherein the movable element is a toothed rack and the movement delay member cooperating therewith is a Honig motor with a pre-determineable torque applyable, rotatable toothed wheel.

13. The springing system according to claim 3, wherein the first control device, from a pre-determinable vibration frequency of the parts which are mounted so as to be movable in an oscillating manner, disables the discharge of air from the pneumatic spring at the start of the first time interval and disables the supply of air to the pneumatic spring at the start of the second time interval.

14. The springing system according to claim 2, wherein the first control device, from a pre-determinable vibration frequency of the parts which are mounted so as to be movable in an oscillating manner, disables the discharge of air from the pneumatic spring at the start of the first time interval and disables the supply of air to the pneumatic spring at the start of the second time interval.

15. The springing system according to claim 2, wherein the second control device can be switched by means of at least one movable element which can be moved by one of the parts which are mounted so as to be movable in an oscillating manner.

16. The springing system according to claim 1, wherein the springing system includes a first control device, and wherein the first control device, from a pre-determinable vibration frequency of the parts which are mounted so as to be movable in an oscillating manner, disables the discharge of air from the pneumatic spring at the start of the first time interval and disables the supply of air to the pneumatic spring at the start of the second time interval.

17. The springing system according to claim 16, wherein the first part is an upper part of the vehicle seat and the second part is a lower part of the vehicle seat.

18. The springing system according to claim 1, wherein the first part is an upper part of the vehicle seat and the second part is a lower part of the vehicle seat.

19. The springing system according to claim 1, wherein the springing system includes a third control device, wherein the third control device comprises a second control valve that is arranged in a supply air line connecting the pneumatic spring with the first control device to enable and disable the supply of air to the pneumatic spring.

20. A method for pneumatic springing of vehicle parts with at least a first and a second part, wherein the two parts are mounted so as to be movable in an oscillating manner and pneumatically sprung with respect to each other by at least one pneumatic spring, wherein a first control device supplies air to and discharges air from the pneumatic spring, which carries out the discharge of air after a first travel end zone of the springing system has been reached in which the pneumatic spring is in a compressed state, and which carries out the supply of air after a second travel end zone of the springing system has been reached in which the pneumatic spring is in an extended state, wherein by means of a second control device air is supplied to the pneumatic spring and the discharge of air from the pneumatic spring is disabled for a pre-determinable first time interval after a first travel end stop in the first travel end zone has been reached for the first time, and/or by means of a third control device during a pre-determinable second time interval air is discharged from the pneumatic spring and the supply of air to the pneumatic spring is disabled after a second travel end stop in the second travel end zone has been reached for the first time.

* * * * *